(12) United States Patent
Bellanger et al.

(10) Patent No.: US 9,341,142 B2
(45) Date of Patent: May 17, 2016

(54) BEAM FOR A CASCADE THRUST REVERSER

(71) Applicant: AIRCELLE, Gonfreville l'Orcher (FR)

(72) Inventors: Alexandre Bellanger, Le Havre (FR); Florent Bouillon, Anglesqueville l'Esneval (FR); Laurent Dubois, Le Havre (FR)

(73) Assignee: AIRCELLE, Gonfreville l'Orcher ( * ) Notice: Subject to any disclaimer, the term of this patent is extended or adjusted under 35 U.S.C. 154(b) by 573 days.

(21) Appl. No.: 13/770,653

(22) Filed: Feb. 19, 2013

(65) Prior Publication Data

US 2013/0161415 A1 Jun. 27, 2013

Related U.S. Application Data

(63) Continuation of application No. PCT/FR2011/051826, filed on Jul. 28, 2011.

(30) Foreign Application Priority Data

Aug. 18, 2010 (FR) ..................................... 10 56647

(51) Int. Cl.
*F02K 1/72* (2006.01)
*F02K 1/80* (2006.01)
*B64D 29/06* (2006.01)

(52) U.S. Cl.
CPC . *F02K 1/72* (2013.01); *B64D 29/06* (2013.01); *F02K 1/80* (2013.01); *F05D 2300/44* (2013.01); *F05D 2300/603* (2013.01); *F05D 2300/612* (2013.01); *F05D 2300/614* (2013.01); *Y02T 50/672* (2013.01)

(58) Field of Classification Search
CPC ........... F02K 1/605; F02K 1/625; F02K 1/70; F02K 1/72; F02K 1/763; F02K 1/766; F02K 1/80; F02K 1/827; F02C 7/20; F02C 7/24; F05D 2300/603–2300/6034; F01D 25/28; F01D 25/24; F01D 25/243; F01D 25/246; B64D 29/06
See application file for complete search history.

(56) References Cited

U.S. PATENT DOCUMENTS

| 3,032,981 | A | * | 5/1962 | Lawler | 239/265.13 |
|---|---|---|---|---|---|
| 4,501,393 | A | * | 2/1985 | Klees et al. | 239/265.13 |
| 5,975,237 | A | * | 11/1999 | Welch et al. | 181/290 |
| 6,824,101 | B2 | * | 11/2004 | Sternberger et al. | 244/110 B |
| 2004/0045765 | A1 | * | 3/2004 | Porte | 181/210 |
| 2007/0207323 | A1 | | 9/2007 | Maxwell | |
| 2007/0294996 | A1 | | 12/2007 | Stephan | |
| 2008/0025846 | A1 | * | 1/2008 | Vance et al. | 416/233 |
| 2009/0246446 | A1 | * | 10/2009 | Backhouse | 428/76 |
| 2011/0030339 | A1 | * | 2/2011 | Cazals et al. | 60/230 |

FOREIGN PATENT DOCUMENTS

FR 2926605 A1 7/2009

* cited by examiner

*Primary Examiner* — Andrew Nguyen
(74) *Attorney, Agent, or Firm* — Burris Law, PLLC

(57) ABSTRACT

The present disclosure relates to a beam, in particular for a cascade thrust reverser, including a skin made of a composite material and defining a closed section, wherein said beam is filled with a core material.

10 Claims, 3 Drawing Sheets

BEAM FOR A CASCADE THRUST REVERSER

CROSS-REFERENCE TO RELATED APPLICATIONS

This application is a continuation of International Application No. PCT/FR2011/051826 filed on Jul. 28, 2011, which claims the benefit of FR 10/56647, filed on Aug. 18, 2010. The disclosures of the above applications are incorporated herein by reference.

FIELD

The present disclosure relates to a beam, in particular for a cascade thrust reverser.

BACKGROUND

The statements in this section merely provide background information related to the present disclosure and may not constitute prior art.

As is known in itself, an aircraft engine, which is generally of the turbojet engine type, is placed inside a nacelle, which, among other functions:
provides the aerodynamic fairing for the engine,
makes it possible to channel outside air toward the engine,
makes it possible to connect the engine to the aircraft.

Traditionally, the connection of the engine to the aircraft is done using a support structure comprising two upper longitudinal beams, often called 12 o'clock beams due to their position at the apex of the nacelle, two lower longitudinal beams, traditionally called 6 o'clock beams due to their position in the lower part of the nacelle, and an assembly with a substantially annular shape called the front frame, in reality made up of two half-frames each extending between said upper and lower longitudinal beams, and designed to be fastened to the periphery of the downstream edge of the fan case of the engine.

Such a traditional configuration is shown in FIG. 1 appended hereto, whereof a rear nacelle portion is shown in this case incorporating a thrust reverser, said rear portion comprising:
two 12 o'clock beams 1a, 1b,
two 6 o'clock beams 2a, 2b,
two front half-frames 3a, 3b, each respectively extending between the 12 o'clock beams 1a, 1b and the 6 o'clock beams 2a, 2b, and supporting cascade vanes 5a, 5b,
two half-cowls 7a, 7b each respectively slidingly mounted on a 12 o'clock beam 1a, 1b and on a 6 o'clock beam 2a, 2b, so as to be able to expose the cascade vanes 5a, 5b so as to perform the thrust reversal.

As is known in itself, during thrust reversal, the air A1 coming from the fan (not shown) and circulating inside the secondary flow tunnel 9a, 9b passes through the vanes 5a, 5b and is expelled toward the front of the nacelle, as indicated by the arrow A2.

Each left and right assembly respectively formed by a 12 o'clock beam, the associated front half-frame, and a 6 o'clock beam, is a rigid assembly with a structural function for the thrust reverser: one such assembly is shown in FIG. 2 (assembly on the left half of the reverser).

As shown in the appended FIGS. 3 and 4, each 12 o'clock beam is traditionally made from a ribbed metal alloy 11 with the base of aluminum, and typically comprises, on the outer surface thereof, primary 13 and secondary 15 rails capable of allowing the movement of the associated half-cowl 7b (not shown), and a plurality of hinge yokes 17a, 17b, 17c, 17d capable of allowing the beam 1b to be hinged on the associated nacelle mast.

A receptacle 19, mounted on the upstream portion (relative to the direction of the flow of air in the nacelle) of the beam 1b, allows fastening of the associated front half-frame 3b designed to support the vanes 5b of the thrust reverser (frame and vanes not shown).

As shown in FIG. 5, the beam 1b is attached by riveting 20 on the upper portion of a fixed inner half-structure panel 18b, generally made from a composite material, and defining the cold air tunnel 9b with the associated thrust reverser half-cowl 7b.

In particular out of a concern for savings in terms of mass, considerable work has been done in recent years to seek solutions using composite materials for the 12 o'clock and 6 o'clock beams, as well as for the front half-frames.

Thus, for example, prior art document US 2007/0294996 describes a composite 12 o'clock beam with the base of carbon fibers, with a closed and hollow section.

Although the beam disclosed by this document has a clear weight reduction, it requires complex molding operations.

SUMMARY

The present disclosure in particular provides a beam for a thrust reverser made from a composite material that is much easier to produce than the aforementioned beam.

The present disclosure provides a beam for a cascade thrust reverser comprising a skin made from a composite material defining a closed section, remarkable in that it is filled with a core material.

"Core material" refers to a material that is rigid enough to allow that material to serve as a removable molding core during resin infusion molding, such as an RTM (Resin Transfer Molding) method, and also light enough not to be detrimental in terms of the concern for reducing weight.

Owing to the features of the present disclosure, the beam can be made very simply: to that end, one need only choose a core material having the desired geometry for the beam, then use that material as the molding core: to that end, the plies of carbon fibers (or others) are surrounded, the assembly thus obtained is placed between two molding dies, and the resin is injected between said two dies that will impregnate the fiber layers, then polymerize under the effect of a temperature increase.

The core material remains inside the skin formed by the fiber layers, like a removable molding core.

This makes it possible to do away with complex molding core recovery means for composite beams made from a composite material with a closed section of the prior art.

This also makes it possible to consider practically any geometry for the beam, which was not the case in the prior art, where there was a dependency on geometries making it possible to remove the core (or cores, in particular in complex molding core systems comprising key or bladder tools) after molding.

According to other optional features of the present disclosure, considered alone or in combination:
said beam comprises closed ends formed by said skin: using a core material forming a removable core makes it possible to produce such a beam easily, unlike the prior art, in which it was necessary to attach elements to close the ends of the beam after having extracted the molding core therefrom;
said beam comprises inner stiffeners: the stiffeners, which may for example be arranged at the hinge yokes, make it possible to increase the strength of the beam relative to buckling; the stiffeners, which compartmentalize the inner cavity of the beam, are very easy to make due to the fact that it is not necessary to remove the core material after molding;

said stiffeners are made from the same composite material as said skin;

said beam comprises at least one thrust reverser cowl guide rail;

said rail is made from the same composite material as said skin;

said beam comprises at least one hinge yoke: such a yoke makes it possible to connect the 12 o'clock beam to the pylon of the aircraft, while allowing it to be hinged around said pylon for maintenance operations; or to connect the two 12 o'clock beams on the one hand and the two 6 o'clock beams on the other hand using suitable flanges, so as to guarantee structural cohesion of the two thrust reverser halves during flight;

said yoke is made from the same composite material as said skin;

said core material is chosen from a group comprising foams and honeycomb structures: these materials provide an excellent strength/weight compromise;

said core material has acoustic absorption properties;

said beam is a 12 o'clock beam;

said beam is a 6 o'clock beam.

The present disclosure also relates to an aircraft engine nacelle, remarkable in that it comprises a thrust reverser comprising at least one beam as described above.

The present disclosure also relates to a method for manufacturing a beam as described above, wherein:

using said core material, a core is made with a shape corresponding to that of said beam, said core material is coated with fiber fabrics, the assembly thus formed is placed between the dies of a resin infusion matrix, resin is injected into said mold so as to impregnate the fiber fabrics, and said resin is heated so as to polymerize it and thereby form said skin.

Further areas of applicability will become apparent from the description provided herein. It should be understood that the description and specific examples are intended for purposes of illustration only and are not intended to limit the scope of the present disclosure.

DRAWINGS

Other features and advantages of the present disclosure will appear upon reading the following description and examining the appended figures, in which FIGS. 1 to 5 refer to the state of the art described in the preamble to this description, and FIG. 6 relates to the present disclosure.

Figure 1:
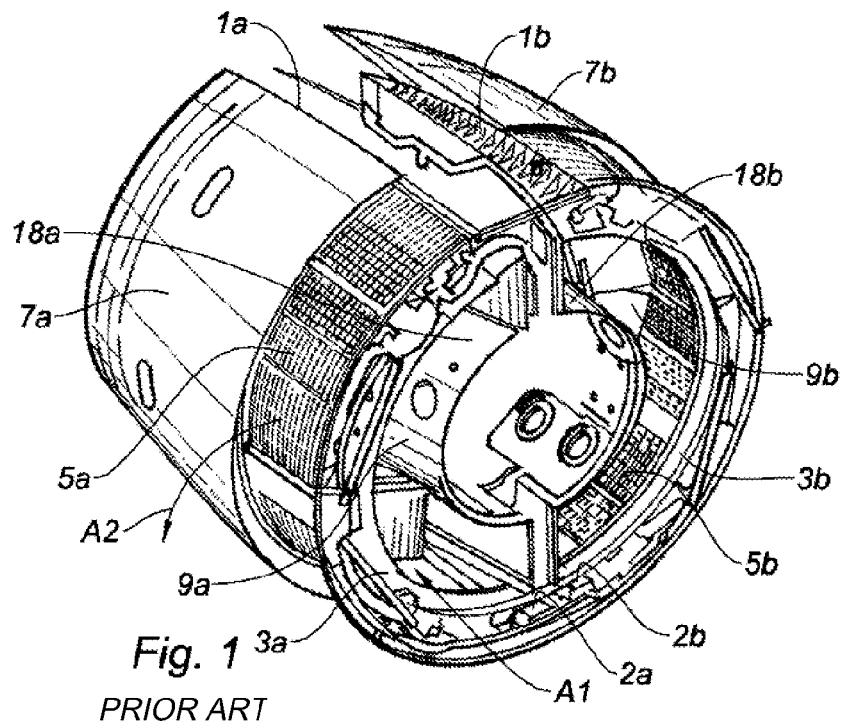
FIG. 1 shows a perspective view of a thrust reverser of the prior art.
Figure 2:
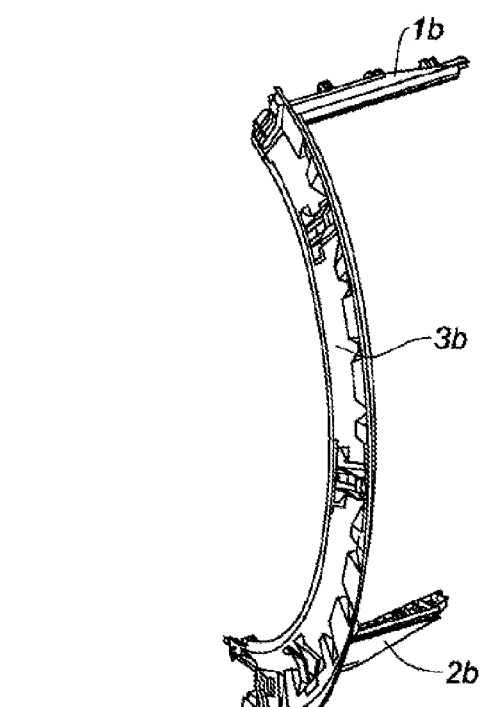
FIG. 2 shows the assembly formed by the left 12 o'clock beam, the left front half-frame and the left 6 o'clock beam of the reverser of FIG. 1.
Figure 3:
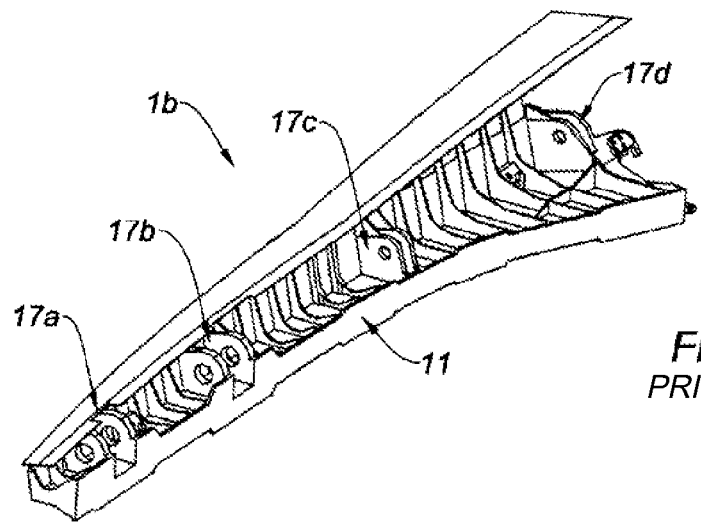
FIGS. 3 and 4 show perspective views, from two different viewing angles, of the left 12 o'clock beam of the thrust reverser of FIG. 1.
Figure 4:
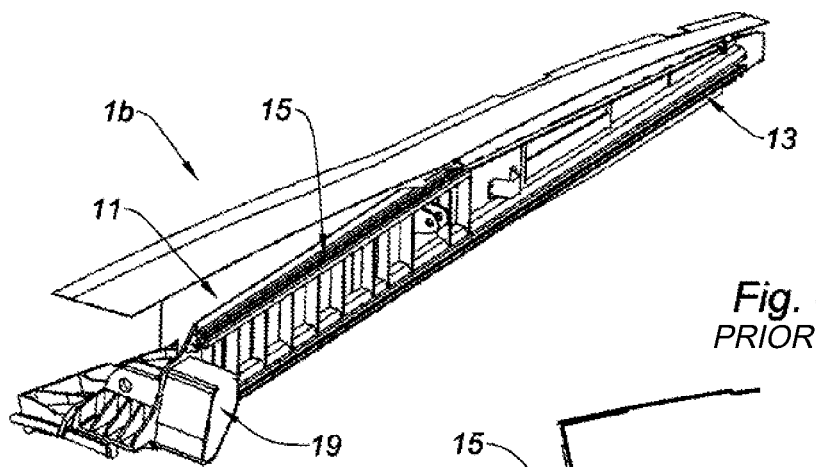
Figure 5:
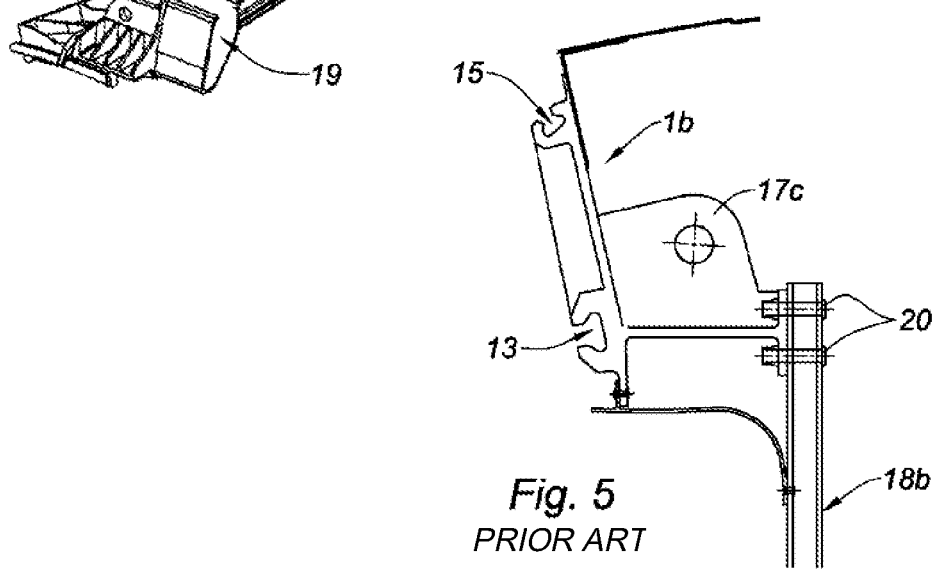
Figure 6:
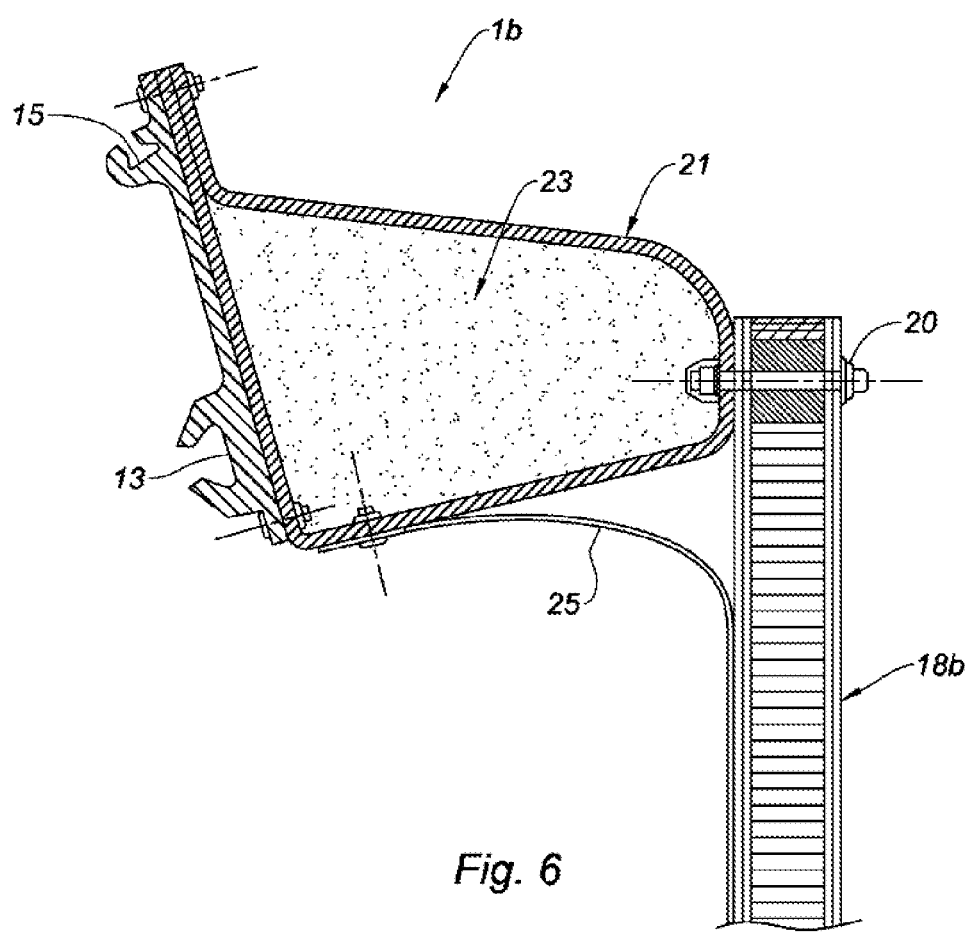

FIG. 5 shows, in transverse cross-section relative to the axis of the thrust reverser, the 12 o'clock beam of FIGS. 3 and 4 fastened on the upper portion of a fixed inner half-structure panel of the thrust reverser of FIG. 1; and FIG. 6 is a view similar to that of FIG. 5, the 12 o'clock beam this time being positioned according to the disclosure.

In all of these figures, identical or similar references designate identical or similar members or sets of members. The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of these figures, identical or similar references designate identical or similar members or sets of members.

In reference to FIG. 6, one can see that the 12 o'clock beam 1*b* is delimited by a skin made from a composite material 21, which may for example be made up of carbon fibers impregnated with an epoxy resin hardened by polymerization.

The skin may be formed by one or more fiber fabrics.

This skin surrounds a core material 23, such that said skin defines a cavity with a closed section filled with said core material.

Said core material is chosen to be rigid enough to be able to form a molding core, and light enough not to cause weight gains inherent to the choice of a composite material to form the skin of the 12 o'clock beam: as previously indicated, hard synthetic foams such as ROHACELL® WF 100, or honeycomb structures, may for example be appropriate.

The rails 13, 15 allowing sliding of the corresponding thrust reverser half-cowl may be made from the same composite material as the skin 21, either at the same time as that skin, or by later fastening or gluing.

Alternatively, these rails may be made from a material other than that of the skin 21, such as a metal alloy, and may in that case be attached on said skin.

Although it is not shown in FIG. 6, the beam 1*b* may also comprise hinge yokes similar to those of the beam of the prior art, in particular shown in FIGS. 3 and 4, said yokes being able to be made in a single piece with or attached on the skin 21, like the rails 13 and 15.

The beam 1*b* according to the present disclosure may also comprise inner stiffeners (not shown) making it possible to increase the strength of said beam relative to buckling, and may in particular be arranged at the aforementioned hinge yokes.

The stiffeners may be made from the same composite material as the skin 21.

As in the case of the 12 o'clock beam of the prior art shown in FIG. 5, the 12 o'clock beam according to the present disclosure may be fastened by riveting 20 or gluing on the upper portion of the fixed inner structural panel 18*b* of the thrust reverser.

An aerodynamic fairing 25 may for example be fastened by riveting or gluing on the skin 21 on the one hand and on the panel 18*b* on the other hand, so as to improve the flow of cool air inside the cold air tunnel 9*b* (see FIG. 1).

To make the 12 o'clock beam 1*b* of FIG. 6, and as previously indicated, a core material 23 is chosen whereof the geometry corresponds to that of the beam one wishes to obtain.

This material is coated with one or more fiber fabrics, for example carbon fiber, and the assembly thus formed is placed between the dies of a resin infusion mold.

The resin is then injected between said dies, using an infusion method, for example of the RTM (Resin Transfer Molding) type, and the resin is heated such that it polymerizes around the carbon fibers, and thereby forms the skin 21.

As will be understood, the core material 23 thus forms the molding core of the beam, and it is not necessary to then remove it, due to its lightness compatible with the quest for reduced weight.

This therefore in particular makes it possible to produce beams having nearly any geometry, both outside and inside, very simply.

Furthermore, associating this core material 23 with the skin 21 having a closed section makes it possible to obtain a beam having excellent buckling strength.

It should be noted that the beam according to the present disclosure may easily have aerodynamic fairings, made during molding.

This beam may also have acoustic absorption characteristics when a core material 23 is chosen having such acoustic absorption properties. It may in particular be a foam or a honeycomb structure. In such a case, one or more walls of the beam exposed to the flow of air may have adapted perforations and be at least partially made from a perforated acoustic skin.

The present disclosure has been described relative to a 12 o'clock beam, but it must be understood that it is also applicable to a 6 o'clock beam, and more generally to any beam involved in the design of aircraft nacelles, and more generally aircraft structures.

The description of the invention is merely exemplary in nature and, thus, variations that do not depart from the substance of the disclosure are intended to be within the scope of the disclosure. Such variations are not to be regarded as a departure from the spirit and scope of the invention.

What is claimed is:

1. An aircraft engine nacelle comprising a cascade thrust reverser having at least one half-cowl slidingly mounted on a beam, the beam comprising a skin made from a composite material defining a closed section, wherein the beam is filled with a foam core material, the beam further comprising at least one of rails and hinge yokes attached on the skin.

2. The aircraft engine nacelle according to claim 1, wherein the beam comprises closed ends formed by said skin.

3. The aircraft engine nacelle according to claim 1, wherein the beam comprises inner stiffeners.

4. The aircraft engine nacelle according to claim 3, wherein said stiffeners are made from the same composite material as said skin.

5. The aircraft engine nacelle according to claim 1, wherein said rail is made from the same composite material as said skin.

6. The aircraft engine nacelle according to claim 1, characterized in that wherein said yoke is made from the same composite material as said skin.

7. The aircraft engine nacelle according to claim 1, wherein said foam core material has acoustic absorption properties.

8. The aircraft engine nacelle according to claim 1, wherein the beam is a 12 o'clock beam.

9. The aircraft engine nacelle according to claim 1, wherein the beam is a 6 o'clock beam.

10. A method for manufacturing a aircraft engine nacelle beam according to claim 1, wherein:

using said foam core material, a foam core is made with a shape corresponding to that of said beam, said foam core material is coated with fiber fabrics to form an assembly, the assembly is placed between dies of a resin infusion mold, resin is injected into said mold so as to impregnate the fiber fabrics, and said resin is heated so as to polymerize and thereby form said skin.

* * * * *